United States Patent
Takemoto

(10) Patent No.: US 7,880,915 B2
(45) Date of Patent: Feb. 1, 2011

(54) COMMUNICATION APPARATUS INCLUDING DOCUMENT DATA STORING FUNCTION AND WEB SERVICE FUNCTION

(75) Inventor: Yuji Takemoto, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1088 days.

(21) Appl. No.: 11/635,462

(22) Filed: Dec. 6, 2006

(65) Prior Publication Data

US 2007/0139706 A1    Jun. 21, 2007

(30) Foreign Application Priority Data

Dec. 19, 2005    (JP) ............................. 2005-364177

(51) Int. Cl.
   *G06F 3/12*    (2006.01)
   *G06F 15/00*   (2006.01)
   *G06K 1/00*    (2006.01)
   *H04N 1/00*    (2006.01)
(52) U.S. Cl. ....................... 358/1.15; 358/402; 358/400
(58) Field of Classification Search ......... 358/1.1–1.18, 358/402, 400
   See application file for complete search history.

(56) References Cited

U.S. PATENT DOCUMENTS

| | | | |
|---|---|---|---|
| 6,952,279 B1 * | 10/2005 | Iida | 358/1.15 |
| 6,956,663 B1 * | 10/2005 | Iida | 358/1.15 |
| 7,577,662 B2 * | 8/2009 | Kasatani | 1/1 |
| 7,640,310 B2 * | 12/2009 | Iida | 709/206 |
| 7,656,550 B2 * | 2/2010 | Yoshioka | 358/1.15 |
| 2002/0048048 A1 * | 4/2002 | Kagawa | 358/402 |
| 2004/0001225 A1 * | 1/2004 | Takahashi | 358/1.15 |
| 2004/0223183 A1 | 11/2004 | Oomori | |
| 2005/0069107 A1 * | 3/2005 | Tanaka et al. | 379/93.17 |
| 2006/0028677 A1 * | 2/2006 | Isshiki et al. | 358/1.15 |

FOREIGN PATENT DOCUMENTS

| | | |
|---|---|---|
| JP | 11-239234 | 8/1999 |
| JP | 2000-224220 | 8/2000 |
| JP | 2002-232634 | 8/2002 |
| JP | 2004-336562 | 11/2004 |

OTHER PUBLICATIONS

Apr. 20, 2010 Japanese official action in connection with correspondent Japanese patent application No. 2005-364177.

* cited by examiner

*Primary Examiner*—James A Thompson
*Assistant Examiner*—Satwant K Singh
(74) *Attorney, Agent, or Firm*—Cooper & Dunham LLP

(57) ABSTRACT

A communication apparatus having a document data storing function for storing received document data and a Web service function for displaying the received document data to an external apparatus via a network is disclosed. The communication apparatus includes a document data sending part for sending the received document data displayed by the Web service function in accordance with a sending request from the external apparatus. When the sending request is made by the external apparatus, the external apparatus can designate sender data indicative of the sender of the received document data.

10 Claims, 9 Drawing Sheets

FIG.3

Date: Fri, 16 Jul 1999 15:47:17 +0900     (MAIL HEADER PART)
MIME-Version: 1.0
From: user-1@xyz.co.jp
To: ifax2@abc.co.jp
Cc: ifax5@abc.co.jp
Subject: fax message
Message-Id: 19990716154717@xyz.co.jp
Content-Type: multipart/mixed; boundary="abcde12345"
Content-Tranfer-Encoding: 7bit
X-Mailer: Becky! ver 1.24

—abcde12345     (TEXT PART)
Content-Type: text/Plain

This is test mail.

—abcde12345     (BINARY PART)
Content-Type: image/tiff, name="fax.tif"
Content-Transfer-Encoding: base64
Content-Discription: "fax.tiff"

(MIME ENCODE DATA)

—abcde12345—

(ADDRESS BOOK DATA)

(ADDRESS DATA)

(USER REGISTRATION DATA)

(USER DATA)

FIG.6A

PLEASE ENTER MAIL
ADDRESS OF SENDER

CANCEL    OK

FIG.6B

PLEASE ENTER MAIL ADDRESS
AND PASSWORD OF SENDER

MAIL ADDRESS:

PASSWORD:

CANCEL    OK

FIG.6C

PLEASE ENTER USER NAME

CANCEL    OK

FIG.6D

PLEASE ENTER USER
ID AND PASSWORD

MAIL ADDRESS:

PASSWORD:

CANCEL    OK

COMMUNICATION APPARATUS INCLUDING DOCUMENT DATA STORING FUNCTION AND WEB SERVICE FUNCTION

BACKGROUND OF THE INVENTION

1. Technical Field

This disclosure relates to a communication apparatus having a document data storing function for storing received document data and a Web service function for displaying the received document data to an external apparatus via a network.

2. Description of the Related Art

In recent years and continuing, there is proposed a system connecting a facsimile machine(s) (network facsimile machine) to a communication network and enabling the facsimile machine to transfer its received documents to an external apparatus(es) via the communication network (see, for example, Japanese Laid-Open Patent Application No. 2002-232634).

In using a conventional network facsimile apparatus in such system, the user of the network facsimile apparatus uses an operations panel of the network facsimile apparatus to select a destination when the user wishes to send a document by electronic mail to a given destination (see, for example, Japanese Laid-Open Patent Application No. 11-239234).

However, in a case where the conventional network facsimile apparatus discloses its stored documents to an external apparatus(es) by using a Web service function, the network facsimile apparatus is confined to using its predetermined mail addresses dedicated for sending data in a case of receiving a request from an external apparatus to send a document. This may become an inconvenience to the degree of freedom of communication application.

BRIEF SUMMARY

In an aspect of this disclosure, there is provided a communication apparatus having a document data storing function for storing received document data and a Web service function for displaying the received document data to an external apparatus via a network, the communication apparatus including: a document data sending part for sending the received document data displayed by the Web service function in accordance with a sending request from the external apparatus, wherein when the sending request is made by the external apparatus, the external apparatus can designate sender data indicative of the sender of the received document data.

In another aspect of this disclosure, there is provided a communication apparatus having a document data storing function for storing received document data and a Web service function for displaying the received document data to an external apparatus via a network, the communication apparatus including: a document data sending part for sending the received document data displayed by the Web service function in accordance with a sending request from the external apparatus, wherein when the sending request is made by the external apparatus, the communication apparatus requests the external apparatus to designate sender data indicative of the sender of the received document data.

In an exemplary embodiment, the sender data is selectable from address book data in which sender data corresponding to a plurality of users is registered.

In an exemplary embodiment, the document data sending part does not send the received document data in a case where the designated sender data is not included in the address book data.

In an exemplary embodiment, the communication apparatus may further include: an authentication function for authenticating a user of the external apparatus; wherein in a case where the authentication of the user is affirmative, the document data sending part sends the received document data when a valid network address corresponding to the user is registered, wherein the document data sending part does not send the received document data when a valid network address corresponding to the user is not registered.

Other aspects, features and advantages will be apparent from the following detailed description when read in conjunction with the accompanying drawings.

BRIEF DESCRIPTION OF THE DRAWINGS

FIG. 3 is a schematic diagram showing an example of an electronic mail message used in sending facsimile image data according to an embodiment of the present invention;

FIGS. 6A-6D are schematic diagrams respectively showing an exemplary configuration of a sender mail address entry screen, a sender data screen, a sender user name entry screen, and a user ID/password entry screen according to an embodiment of the present invention;

DESCRIPTION OF THE PREFERRED EMBODIMENTS

In the following, embodiments of the present invention will be described with reference to the accompanying drawings.

Figure 1:
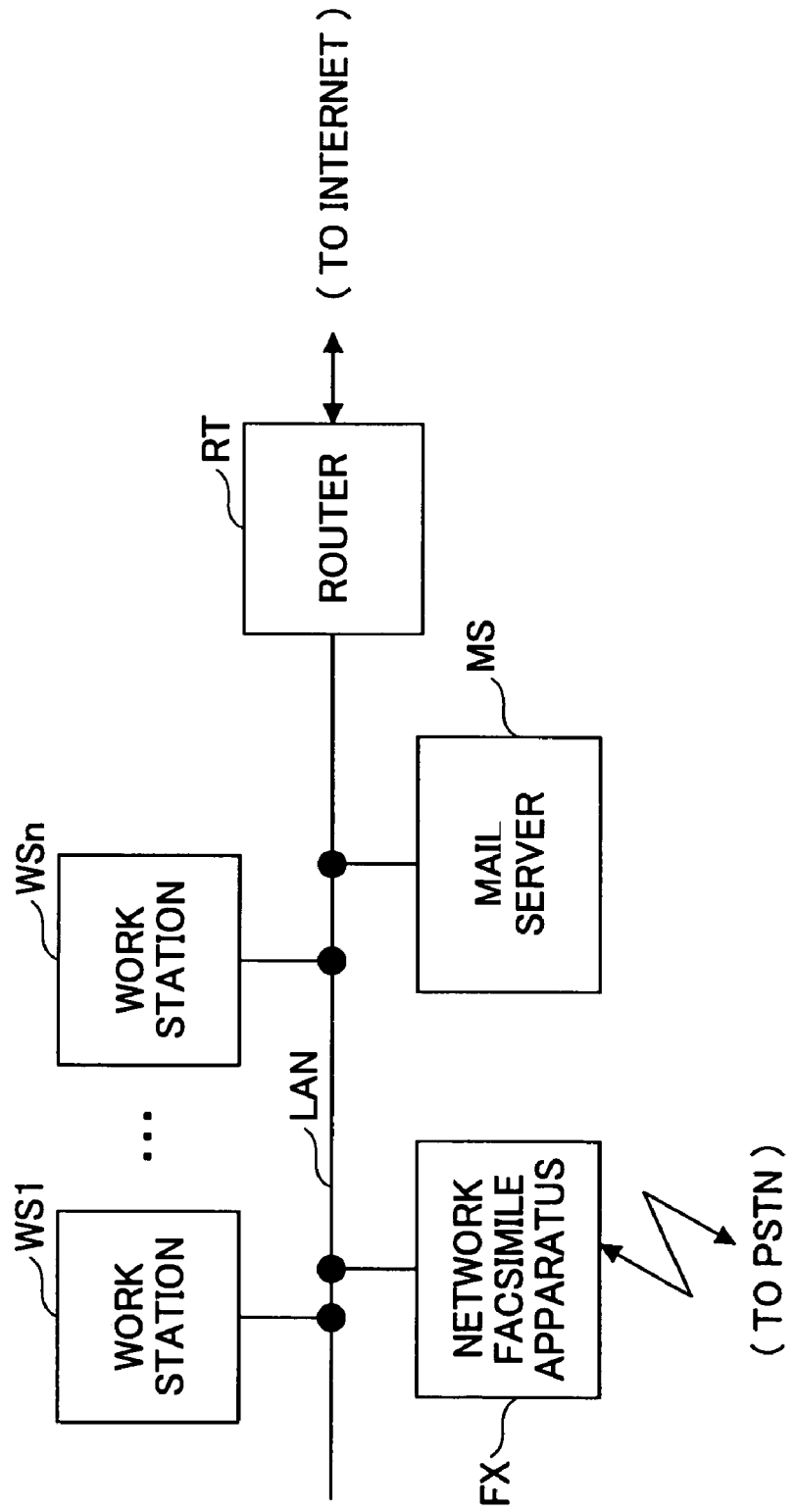
FIG. 1 a schematic diagram showing a network system according to an embodiment of the present invention.

FIG. 1 is a schematic diagram showing a network system according to an embodiment of the present invention.

In FIG. 1, plural work station apparatuses WS1 through WSn, a mail server apparatus MS, and a network facsimile apparatus (communication apparatus) FX are connected to a local area network LAN. The local area network LAN is also connected to the Internet via a router apparatus RT. Therefore, the work station apparatuses WS1-WSn, the mail server apparatus MS, and the network facsimile apparatus FX can exchange data with other terminals via the Internet.

In this example, the mail server apparatus MS provides the users of the work station apparatuses WS1-WSn and the network facsimile apparatus FX with services including, for example, a common electronic mail collecting service and an electronic mail distributing service via the local area network LAN.

The work station apparatuses WS1-WSn are supplied with various programs including, for example, facsimile application software for creating, displaying, and outputting facsimile image data as well as various software items (including Web browsing software) for exchanging various data via the local area network LAN. The various programs stored in the workstation apparatuses WS1-WSn are to be used by a predetermined user. The predetermined user may be one or more users.

The network facsimile apparatus FX has various processing functions including, for example, an electronic mail processing function for exchanging electronic mail (e.g. image data, various reports), a Group 3 (G3) facsimile transmission function for connecting to an analog public switched telephone network (PSTN) and sending data (e.g. image data) in compliance with a G3 facsimile transmission procedure by using the public switched telephone network as a transmission path, and a Web server function for enabling a Web client of an external apparatus(es) to browse a document stored in the network facsimile apparatus FX.

Figure 2:
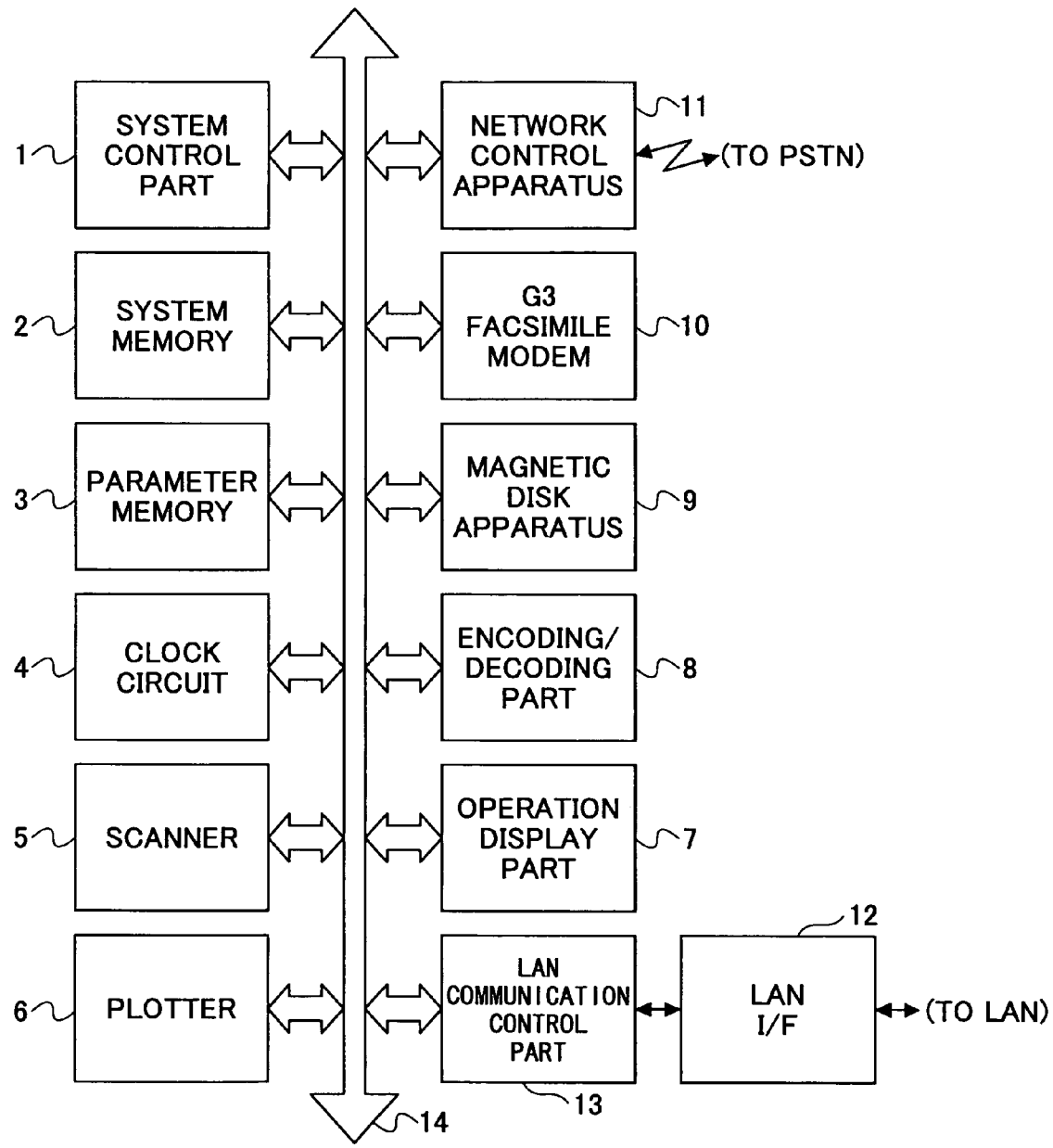
FIG. 2 is a schematic diagram showing an exemplary configuration of a network facsimile apparatus FX according to an embodiment of the present invention.

FIG. 2 is a schematic diagram showing an exemplary configuration of a network facsimile apparatus FX according to an embodiment of the present invention. The network facsimile apparatus FX shown in FIG. 2 includes a system control part 1, a system memory 2, a parameter memory 3, a clock circuit 4, a scanner 5, a plotter 6, an operation display part 7, an encoding/decoding part 8, a magnetic disk apparatus 9, a Group 3 (G3) facsimile modem 10, a network control apparatus 11, a local area network (LAN) interface circuit 12, and a local area network (LAN) communication control part 13. In FIG. 2, the system control part 1 is for executing various controls including, for example, controlling respective parts and components of the network facsimile apparatus FX and controlling facsimile communication procedures. The system memory 2 stores various data required for executing controls and processes of the system control part 1 and serves as a work area of the system control part 1. The parameter memory 3 is for storing various data that are unique to the network facsimile apparatus FX. The clock circuit 4 is for outputting current time data.

The scanner 5 is for reading out original document images with a predetermined resolution. The plotter 6 is for recording and outputting images with a predetermined resolution. The operation display part 7 is for operating the network facsimile apparatus FX. The operation display part 7 includes, for example, various operation keys and displays.

The encoding/decoding part 8 is for encoding (compressing) image signal(s) to image data and decoding image data to its original image signal. The magnetic disk apparatus 9 is for storing encoded (compressed) image data and other file data.

The G3 facsimile mode 10 is for executing various modem functions of a G3 facsimile apparatus including, for example, a low speed modem function for exchanging transmission procedure signals and a high speed modem function for exchanging image data (e.g. V.17 modem, V.34 modem, V.29 modem, V.27 ter modem).

The network control apparatus 11 is for connecting the network facsimile apparatus FX to the analog PSTN (Public Switched Telephone Network). The network control apparatus 11 includes an automatic sending/receiving function.

The local area network interface circuit 12 is for connecting the network facsimile apparatus FX to the local area network LAN. The local area network communication control part 13 is for executing communication controls of various protocol suites for exchanging various data with other data terminals via the local area network LAN.

The above-described system control part 1, the system memory 2, the parameter memory 3, the clock circuit 4, the scanner 5, the plotter 6, the operation display part 7, the encoding/decoding part 8, the magnetic disk apparatus 9, the G3 facsimile modem 10, the network control apparatus 11, and the LAN communication control part 13 are connected to an internal bus 14. The data exchanges conducted among the above-described elements (terminals) of the network facsimile apparatus FX are mainly executed via the internal bus 14.

Furthermore, the data exchange between the network control apparatus 11 and the G3 facsimile modem 10 is conducted directly.

In this example, the data exchange between terminals connected to the local area network LAN is basically conducted by using a combination of transmission protocols up to the transport layer (so-called "TCP/IP layer") and higher communication protocols above the TCP/IP layer (so-called "protocol suite"). For example, data exchange by electronic mail is conducted by using an upper layer protocol such as SMTP (Simple Mail Transfer Protocol).

Furthermore, POP (Post Office Protocol) may be used as the protocol for enabling each terminal to confirm reception of electronic mail addressed to a corresponding user or request to obtain electronic mail with respect to the mail server MS.

The above-described communication protocols (e.g. TCP/IP, SMTP, POP), data formats of electronic mail, and the data structures are stipulated in an RFC document issued by the IETF. For example, TCP is stipulated in RFC 793, I/P is stipulated in RFC 793, SMTP is stipulated in RFC 821, and data formats of electronic mail are stipulated in RFC 822, RFC 1521, and RFC 1522 (MIME (Multi Purpose Mail Extension).

Moreover, in a case of exchanging facsimile image data by using electronic mail, a predetermined data conversion method (e.g. Base 64 encoding method) is used for converting the facsimile image data into readable data since binary data including facsimile image data cannot be directly included in electronic mail. For example, the facsimile image data may be included in electronic mail after converting the facsimile image data into a readable data format such as 7 bit character code by using a base 64 encoding method. The format of the main text data of the electronic mail is referred to as MIME format.

Next, an example of an electronic mail (electronic mail message) used in sending facsimile image data is described with reference to FIG. 3.

The electronic mail message shown in FIG. 3 employs a multiple part MIME format having plural main text parts and includes a mail header part, a text part, and a binary part. The mail header part includes various data items such as an electronic mail sending date (field "Date"), a destination mail address (field "To"), and a sender (sender origin) mail address (field "From"). The text part is for carrying text data. The binary part is for carrying facsimile image data. MIME encoded data, which are obtained by MIME conversion of the facsimile image data, are arranged in the binary part.

Moreover, the facsimile image data, which are to be carried by electronic mail, are compressed by performing MH encoding on the original image data that have been converted to TIFF-F format. Therefore, in this example, the MIME encoded data are obtained by performing MIME conversion on the TIFF-F data.

Since plural pages of image data can be combined into a single file by using the TIFF-F format, a single image data transmission file including plural pages can be arranged in a single binary part.

Figure 4A:
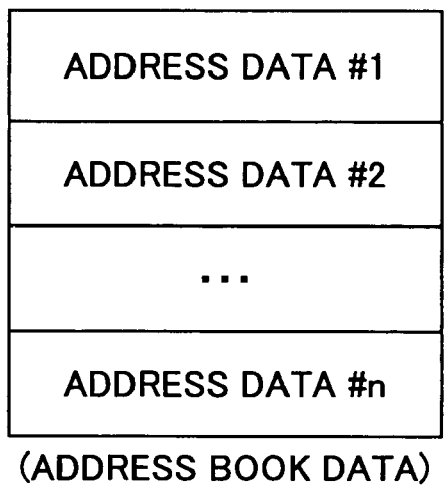
FIGS. 4A-4D are schematic diagrams respectively showing an exemplary configuration of address book data (address list data), address data, user registration data, and user data according to an embodiment of the present invention.
Figure 4B:
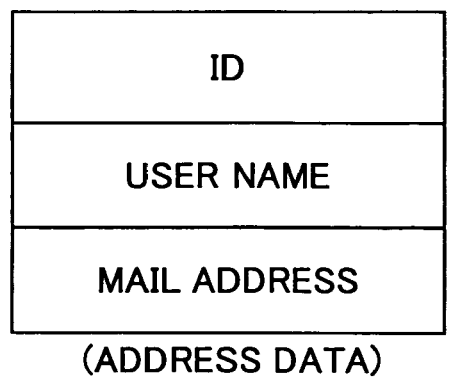

As shown in FIG. 4A, the network facsimile apparatus FX according to an embodiment of the present invention has address book data (address list data) having plural address data (data items) registered therein. Each address data item includes an ID for differentiating with other address data items, the name of the user (user name) registered to the address data item, and a mail address of the user registered to the data item.

Figure 4C:
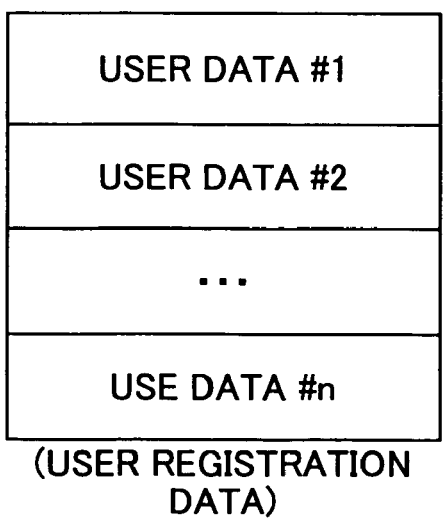
Figure 4D:
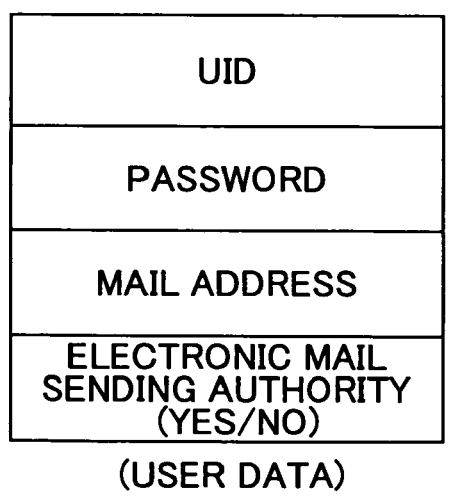

Furthermore, the network facsimile apparatus FX has a user authentication function that is used when authenticating a user of an external apparatus requesting to browse a document with the Web service function. Upon conducting the authentication, the network facsimile apparatus FX refers to user registration data as shown in FIG. 4C.

The user registration data is registered with plural user data items. Each user data item includes a UID (User ID) indicative of the identification data of the user, a registered password, a mail address of the user corresponding to the user data item, and an electronic mail sending authority indicative of whether the user has the authority to send documents by electronic mail (indicated by either "YES" or "NO").

The Web service function of the network facsimile apparatus FX according to an embodiment of the present invention allows a Web browser of an external apparatus to browse one or more facsimile documents stored in the magnetic disk apparatus 9 through a Web page of a predetermined URL.

In this example, the facsimile documents stored in the magnetic disk apparatus 9 include, for example, a document received by the network facsimile apparatus FX via an analog PSTN, a document received by the network facsimile apparatus FX via electronic mail, and a document read out and input from a local scanner 5.

Figure 5:
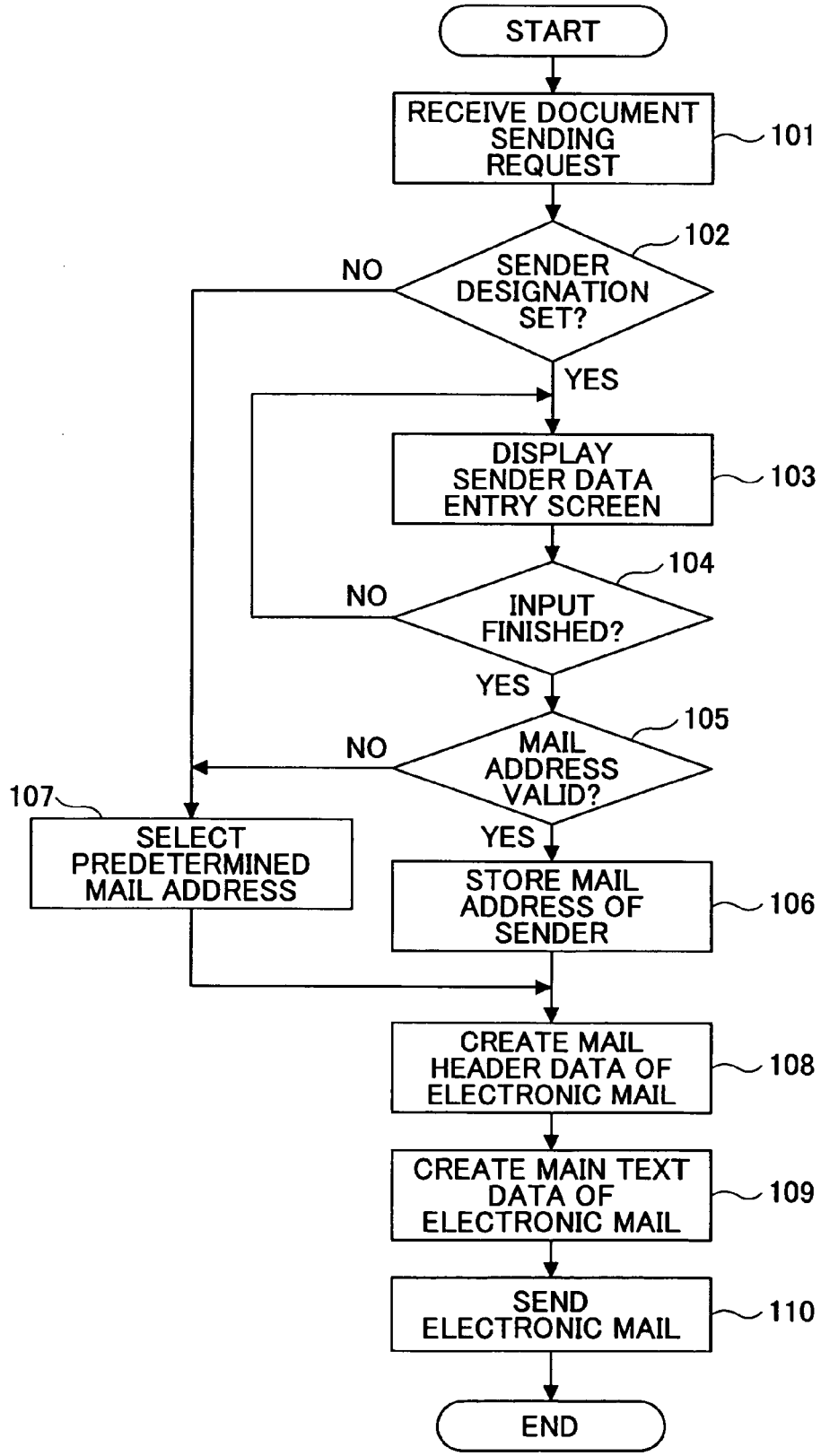
FIG. 5 is a flowchart showing an exemplary operation of the network facsimile apparatus FX in a case where a Web server function of a network facsimile apparatus FX receives a request for sending of a document by a user of an external apparatus according to an embodiment of the present invention.

FIG. 5 is a flowchart showing an exemplary operation of the network facsimile apparatus FX in a case where the Web server function of the network facsimile apparatus FX receives a request for sending of a document by a user of an external apparatus.

When receiving a mail address of a predetermined destination and a document sending request (Step 101) from the user, the network facsimile apparatus FX determines whether its "sender designation mode" is turned on (Step 102). In a case where the result of Step 102 is "YES", the network facsimile apparatus FX obtains electronic mail data of the sender from the user requesting document sending.

Then, the network facsimile apparatus FX sends data of a sender mail address entry screen (see FIG. 6A) to the user who has requested the document sending (Step 103). The network facsimile apparatus FX waits until the mail address of the sender is input by the user (loop of "NO" in Step 104).

After the mail address of the sender is input by the user of the external apparatus ("YES" in Step 104), the network facsimile apparatus FX determines whether the input mail address is valid (Step 105). For example, the network facsimile apparatus FX determines the input mail address to be invalid ("NO" in Step 105) when the input mail address is blank.

In a case where the network facsimile apparatus FX determines the input mail address to be valid ("YES" in Step 105), the network facsimile apparatus FX sets (selects) the input mail address as the mail address of the sender and stores the input mail address (Step 106).

In a case where the network facsimile apparatus FX determines the input mail address to be invalid ("NO" in Step 105), the network facsimile apparatus FX sets (selects) its own predetermined mail address (not shown) as the mail address of the sender (Step 107). The predetermined mail address of the network facsimile apparatus FX is assigned (set) to the network facsimile apparatus beforehand.

After the mail address of the sender is set, the network facsimile apparatus FX creates header data of the electronic mail to be sent to the predetermined destination (Step 108). Then, the network facsimile apparatus FX creates main text data of the electronic mail to be sent to the predetermined destination (Step 109). The document requested to be sent is included in the main text data in the form of an attachment file. Then, an electronic mail (electronic mail message) including the header data and the main text data is sent to the mail server apparatus MS (Step 110).

In a case where the mail server apparatus MS requires a user ID and a password, the mail server apparatus MS may request the sender of the electronic mail (i.e. user of the external apparatus) to input a mail address (user ID) and a password via a sender data screen, for example, shown in FIG. 6B.

With the network facsimile apparatus according to the above-described embodiment of the present invention, in a case where a user of an external apparatus requests a document stored in the network facsimile apparatus FX be sent to a predetermined destination, the mail address of the sender can be discretionarily designated by the user of the external apparatus. This enhances the degree of freedom in sending, for example, document data.

Figure 7:
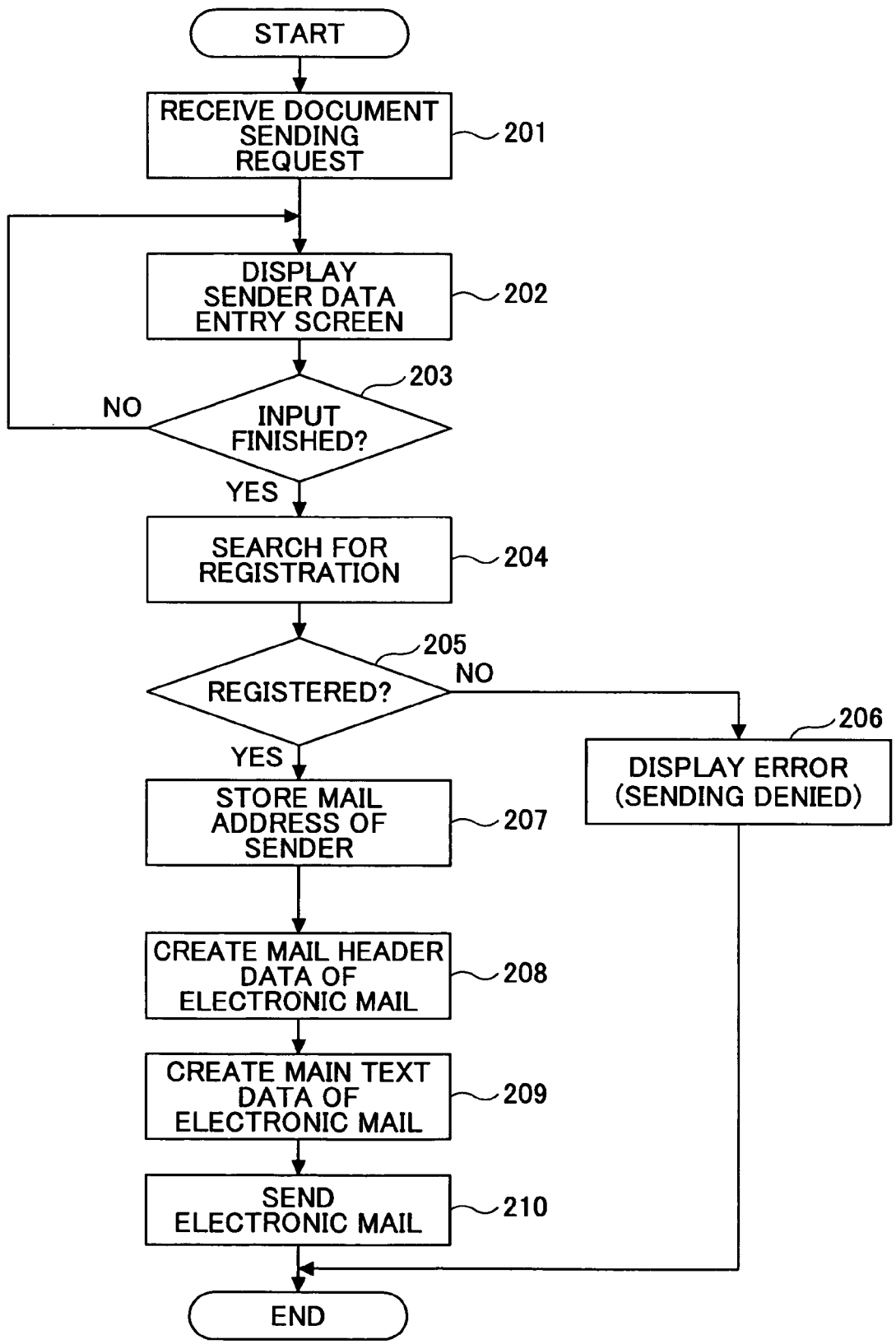
FIG. 7 is a flowchart showing another exemplary operation of the network facsimile apparatus FX in a case where a Web server function of a network facsimile apparatus FX receives a request for sending of a document by a user of an external apparatus according to an embodiment of the present invention.

FIG. 7 is a flowchart showing an exemplary operation of the network facsimile apparatus FX in a case where the Web server function of the network facsimile apparatus FX receives a request for sending of a document by a user of an external apparatus.

When receiving a mail address of a predetermined destination and a document sending request (Step 201) from the user, the network facsimile apparatus FX sends data of a sender mail address entry screen (see FIG. 6A) to the user that has requested the document sending (Step 202). The network facsimile apparatus FX waits until the mail address of the sender is input by the user (loop of "NO" in Step 203).

After the mail address of the sender is input by the user of the external apparatus ("YES" in Step 203), the network facsimile apparatus FX searches through the address book (address list) (Step 204) and determines whether the input mail address is registered as one of the mail addresses in the address book (Step 205).

In a case where the mail address of the sender is not registered in the address book ("NO" in Step 205), the network facsimile apparatus FX sends an error display to the user of the external apparatus indicating that the requested document cannot be sent (Step 206). After the error display is sent, the operation is finished.

On the other hand, in a case where the mail address of the sender is registered in the address book ("YES" in Step 205), the network facsimile apparatus FX sets (selects) the input mail address as the mail address of the sender and stores the input mail address (Step 207).

After the mail address of the sender is set, the network facsimile apparatus FX creates header data of the electronic mail to be sent to the predetermined destination (Step 208). Then, the network facsimile apparatus FX creates main text data of the electronic mail to be sent to the predetermined destination (Step 209). The document requested to be sent is included in the main text data in the form of an attachment file. Then, an electronic mail (electronic mail message) including the header data and the main text data is sent to the mail server apparatus MS (Step 210).

With the network facsimile apparatus according to the above-described embodiment of the present invention, in a case where the mail address of the sender (mail address of the user requesting sending of the document) is not properly registered in the address book of the network facsimile apparatus FX, the requested document stored in the network facsimile apparatus FX can be prevented from being sent. This allows document data to be sent more safely.

Figure 8:
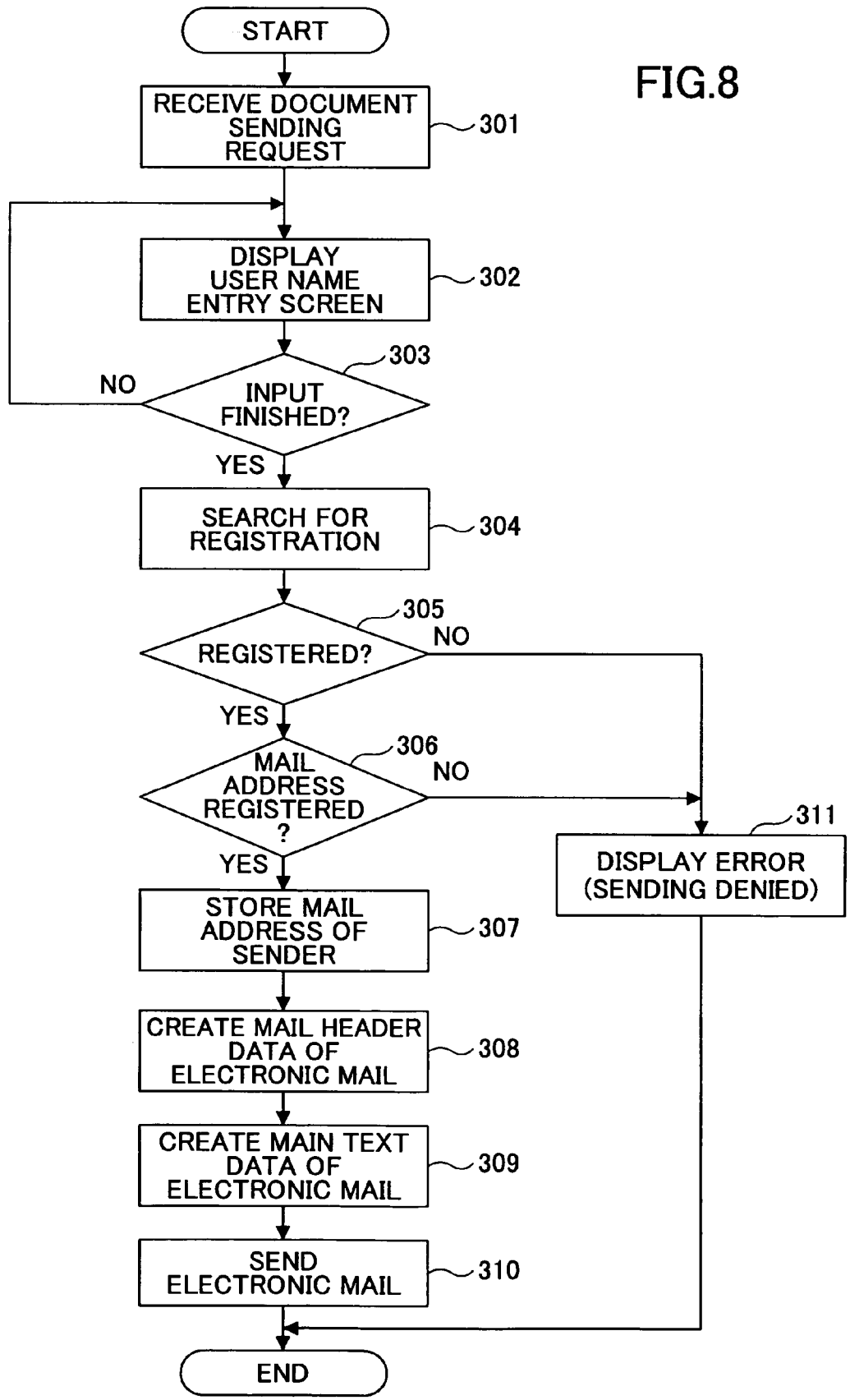
FIG. 8 is a flowchart showing yet another exemplary operation of the network facsimile apparatus FX in a case where a Web server function of the network facsimile apparatus FX receives a request for sending of a document by a user of an external apparatus according to an embodiment of the present invention.

FIG. 8 is a flowchart showing yet another exemplary operation of the network facsimile apparatus FX in a case where the Web server function of the network facsimile apparatus FX receives a request for sending of a document by a user of an external apparatus.

When receiving a mail address of a predetermined destination and a document sending request (Step 301) from the user, the network facsimile apparatus FX sends data of a sender user name entry screen (see FIG. 6C) to the user that has requested the document sending (Step 302). The network facsimile apparatus FX waits until the user name of the sender is input by the user (loop of "NO" in Step 303).

After the user name of the sender is input by the user of the external apparatus ("YES" in Step 303), the network facsimile apparatus FX searches through the address book (address list) (Step 304) and determines whether the input user name is registered as one of the user names in the address book (Step 305).

In a case where the user name of the sender is registered in the address book ("YES" in Step 305), the network facsimile apparatus FX searches through the address book and determines whether a mail address corresponding to the input user name is registered in the address book (Step 306). In a case where the mail address corresponding to the input user name of the sender is registered in the address book ("YES" in Step 306), the network facsimile apparatus FX sets (selects) the corresponding mail address as the mail address of the sender and stores the input mail address (Step 307).

After the mail address of the sender is set, the network facsimile apparatus FX creates header data of the electronic mail to be sent to the predetermined destination (Step 308). Then, the network facsimile apparatus FX creates main text data of the electronic mail to be sent to the predetermined destination (Step 309). The document requested to be sent is included in the main text data in the form of an attachment file. Then, an electronic mail (electronic mail message) including the header data and the main text data is sent to the mail server apparatus MS (Step 310).

Meanwhile, in a case where the user name of the sender is registered in the address book but no mail address corresponding to the user name is registered in the address book ("NO" in Step 306) or in a case where the user name of the sender is not registered in the address book, is ("NO" in Step 305), the network facsimile apparatus FX sends an error display to the user of the external apparatus indicating that the requested document cannot be sent (Step 311). After the error display is sent, the operation is finished.

With the network facsimile apparatus according to the above-described embodiment of the present invention, in a case where the user name or mail address of the sender (user name or mail address of the user requesting sending of the document) is not properly registered in the address book of the network facsimile apparatus FX, the requested document stored in the network facsimile apparatus FX can be prevented from being sent. This allows document data to be sent more safely.

Figure 9:
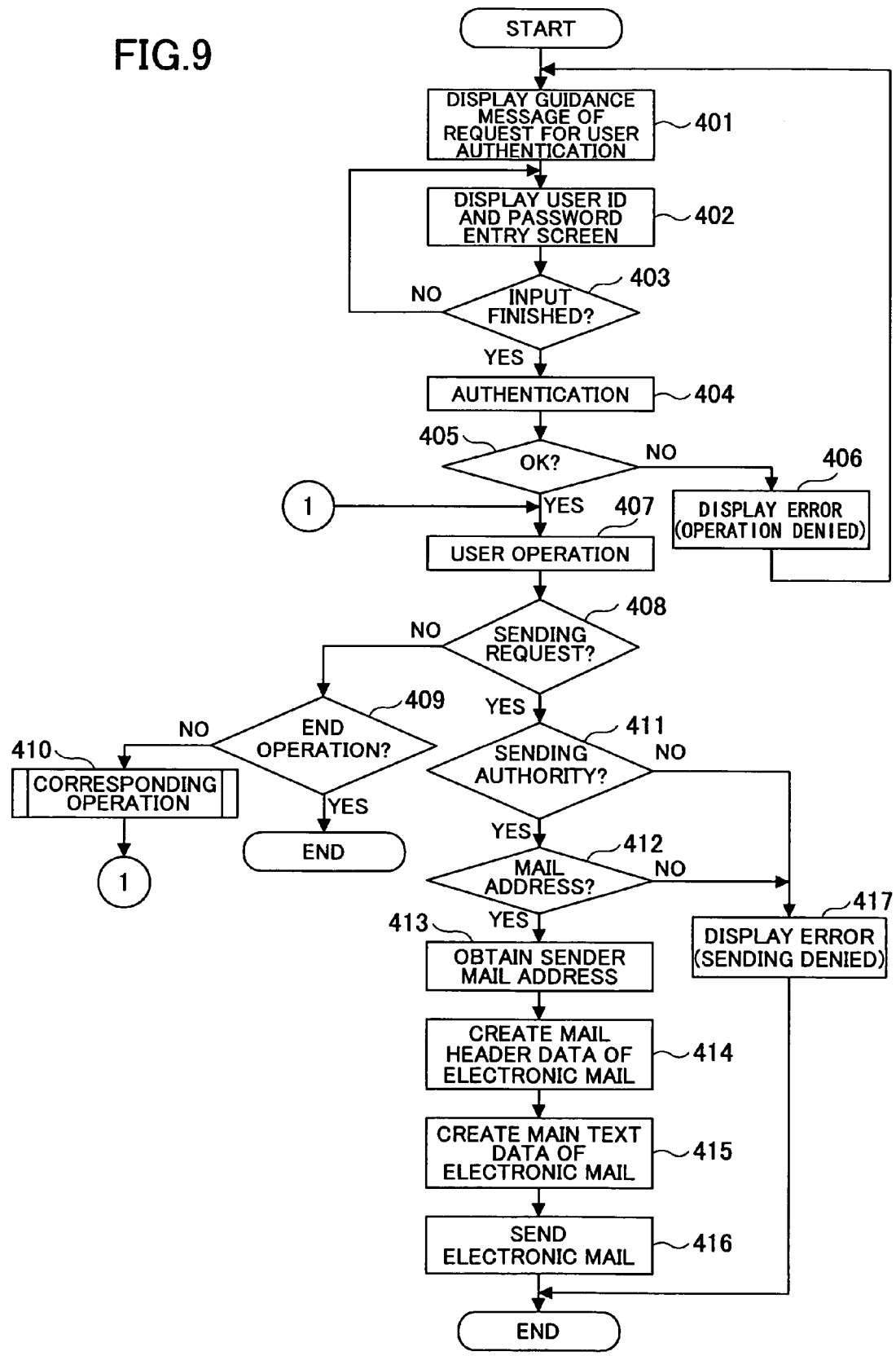
FIG. 9 is a flowchart showing an exemplary operation of the network facsimile apparatus FX in a case where a Web server function of the network facsimile apparatus FX receives a request for access from a user of an external apparatus according to an embodiment of the present invention.

FIG. 9 is a flowchart showing an exemplary operation of the network facsimile apparatus FX in a case where the Web server function of the network facsimile apparatus FX receives a request for access from a user of an external apparatus.

When receiving an access request (Step 401) from the user, the network facsimile apparatus FX sends a guidance message requesting user authentication to the user of the external apparatus that has requested access (Step 402). Then, the network facsimile apparatus FX sends data of a user ID/password entry screen (see FIG. 6D) to the user that has requested access (Step 402). The network facsimile apparatus FX waits until the user ID and password of the sender are input by the user (loop of "NO" in Step 403).

After the user ID and password of the sender are input by the user of the external apparatus ("YES" in Step 403), the network facsimile apparatus FX makes reference to its user registration data and performs a predetermined authentication process (Step 404).

In the authentication process, when the authentication is negative (NG) ("NO" in Step 405), the network facsimile apparatus FX sends an error display to the user of the external apparatus preventing the user from performing an operation on the network facsimile apparatus FX (Step 406). Then, the operation returns to Step 401.

Meanwhile, when the authentication is affirmative (OK) in the authentication process of Step 404, the user inputs an operation to be executed by the network facsimile apparatus FX. Then, the network facsimile apparatus FX determines the kind of operation input by the user including, for example, an operation requesting sending of a document including notification of the electronic address of a destination (document sending operation) or an operation requesting to end connection (connection ending operation) (Steps 408, 409). In a case where the input operation is an operation requesting to end connection, the operation is finished ("YES" in Step 409).

Furthermore, in a case where the input operation is other than the document sending operation or the connection ending operation, the network facsimile apparatus FX executes the operation input by the user (Step 410).

In a case where the operation input by the user is a document sending operation ("YES" in Step 408), the network facsimile apparatus FX searches the user data to determine whether there is an electronic mail sending authority corresponding to the currently logged on user (Step 411). In a case the determination result in Step 411 is affirmative ("YES" in Step 411), the network facsimile apparatus FX searches the user data to determine whether there is a corresponding mail address (appropriate value) is registered in the user data (Step 412).

In a case where the determination result is affirmative ("YES" in Step 412), the network facsimile apparatus FX reads out the corresponding mail address registered in the user data and sets the mail address as the mail address of the sender (Step 413).

Accordingly, after the mail address of the sender is set, the network facsimile apparatus FX creates header data of the electronic mail to be sent to the predetermined destination (Step 414). Then, the network facsimile apparatus FX creates main text data of the electronic mail to be sent to the predetermined destination (Step 415). The document requested to be sent is included in the main text data in the form of an attachment file. Then, an electronic mail (electronic mail message) including the header data and the main text data is sent to the mail server apparatus MS (Step 416).

Meanwhile, in a case where no suitable mail address is registered in the user data ("NO" in Step 412) or in a case where there is no corresponding electronic mail sending authority in the user data ("NO" in Step 411), the network facsimile apparatus FX sends an error display to the user of the external apparatus indicating that the requested document cannot be sent (Step 417). After the error display is sent, the operation is finished.

With the network facsimile apparatus according to the above-described embodiment of the present invention, since the mail address of the sender can be obtained by using the user authentication results in a case where document sending is requested, the labor of inputting the mail address can be saved for the user. Furthermore, an incorrect mail address can be prevented from being input since the user is unable to input a given mail address.

It is to be noted that, although the above-described embodiments of the network facsimile apparatus FX send data of a requested document by using electronic mail, the network facsimile apparatus FX may also send the data by performing facsimile communication through an analog PSTN. In this case, the mail address of the sender may be used as, for example, TTI display data, communication history data (not shown), or a communication management "From" value.

Furthermore, in the case where communication history data is created, the value which is set in the "From" field of the header data of an electronic mail (electronic mail message) is to be stored as the mail address of the sender.

Furthermore, the present invention is not limited to the above-described network facsimile apparatus, but may also be applied to a communication apparatus having a similar configuration.

Hence, with the communication apparatus according to the above-described embodiment of the present invention, a user requesting a document to be sent can discretionally set (designate) the data of the sender of the document. Thereby, the degree of freedom of communication application can be improved.

Further, the present invention is not limited to these embodiments, but variations and modifications may be made without departing from the scope of the present invention.

The present application is based on Japanese Priority Application No. 2005-364177 filed on Dec. 19, 2005, with the Japanese Patent Office, the entire contents of which are hereby incorporated by reference.

What is claimed is:

1. A communication apparatus having a document data storing function for storing received document data and a Web service function for displaying the received document data to an external apparatus via a network, the communication apparatus comprising:
 a document data sending part for sending the received document data to the external apparatus, in accordance with a sending request from the external apparatus,
 wherein when the sending request is made by the external apparatus, the document data sending part is configured to send data of a sender mail address entry screen to input sender data indicative of the sender of the received document data, and
 wherein if the sender data is not received from the external apparatus, the communication apparatus performs document data transmission using preset sender data, and
 wherein if the sender data is received from the external apparatus, the communication apparatus performs document data transmission using the received sender data.

2. The communication apparatus as claimed in claim 1, wherein the sender data is selectable from address book in which sender data corresponding to a plurality of users is registered.

3. The communication apparatus as claimed in claim 1 in which the sender data is an email address.

4. The communication apparatus as claimed in claim 2 in which the sender data is an email address.

5. A method performed by a communication apparatus, the method comprising:
 a document data storing step for storing received document data;
 a data sending step for sending the received document data, in response to a sending request from the external apparatus;
 an address entry screen data sending step for sending data of a sender mail address entry screen to input sender data indicative of the sender of the received document data, when the sending request is made by the external apparatus;
 a preset sender data transmission step for performing document data transmission using preset sender data, if the sender data is not received from the external apparatus; and
 a received sender data transmission step for performing document data transmission using the received sender data, if the sender data is received from the external apparatus.

6. The method as claimed in claim 5, wherein the sender data input through the sender mail address entry screen is an email address.

7. The method as claimed in claim 5, wherein the sender data is input by user selection from an address book in which sender data corresponding to a plurality of users is registered.

8. The method as claimed in claim 5, further comprising:
 performing document data transmission using preset sender data, if no data is input through the sender mail address entry screen.

9. The method as claimed in claim 5, further comprising:
 performing document data transmission using preset sender data, if data is input through the sender mail address entry screen and the input data is not valid.

10. The method as claimed in claim 5, further comprising:
 providing a Web service by the communication apparatus, the Web service allowing the document data sent in the data sending step to be displayed for browsing at the external apparatus.

* * * * *